Jan. 31, 1967    E. H. FLETCHER ETAL    3,301,079
VEHICLE TRANSMISSION
Filed Sept. 15, 1964    3 Sheets-Sheet 1
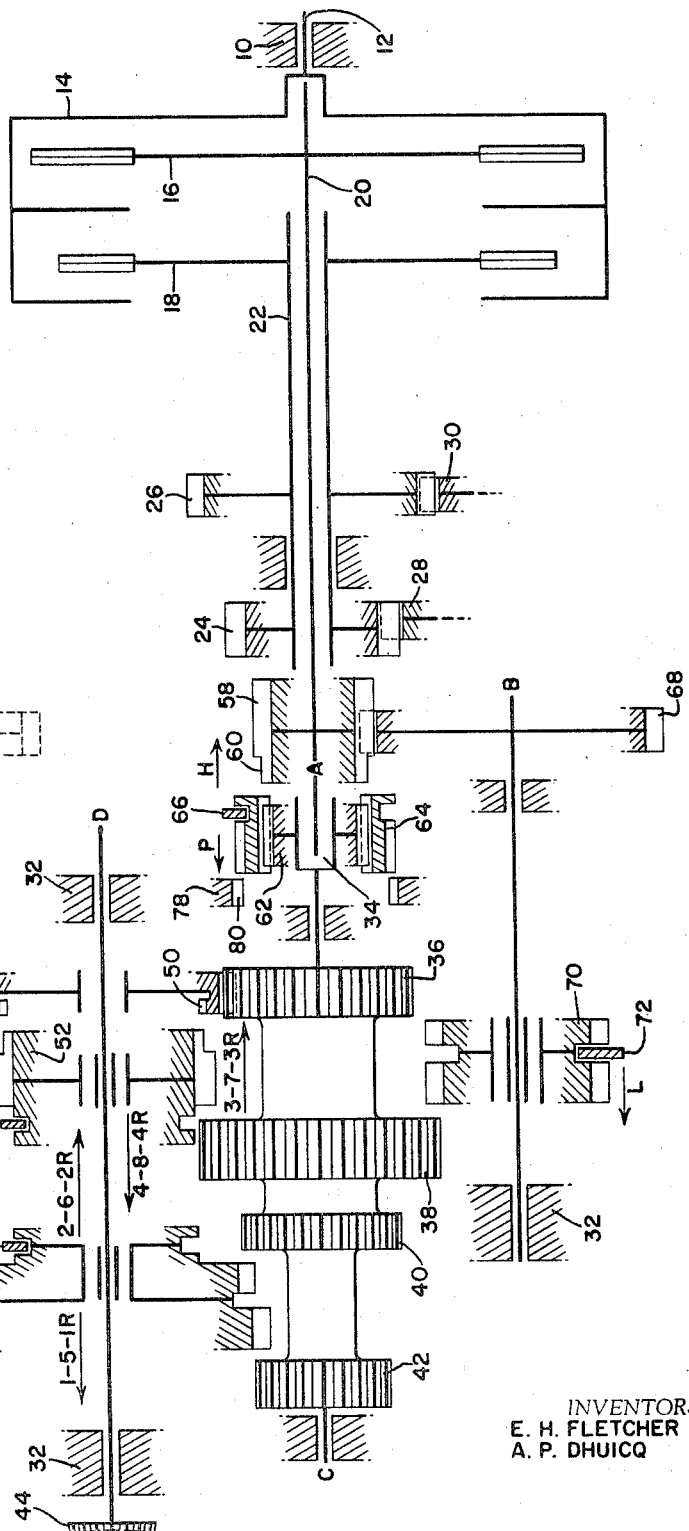
INVENTORS
E. H. FLETCHER
A. P. DHUICQ

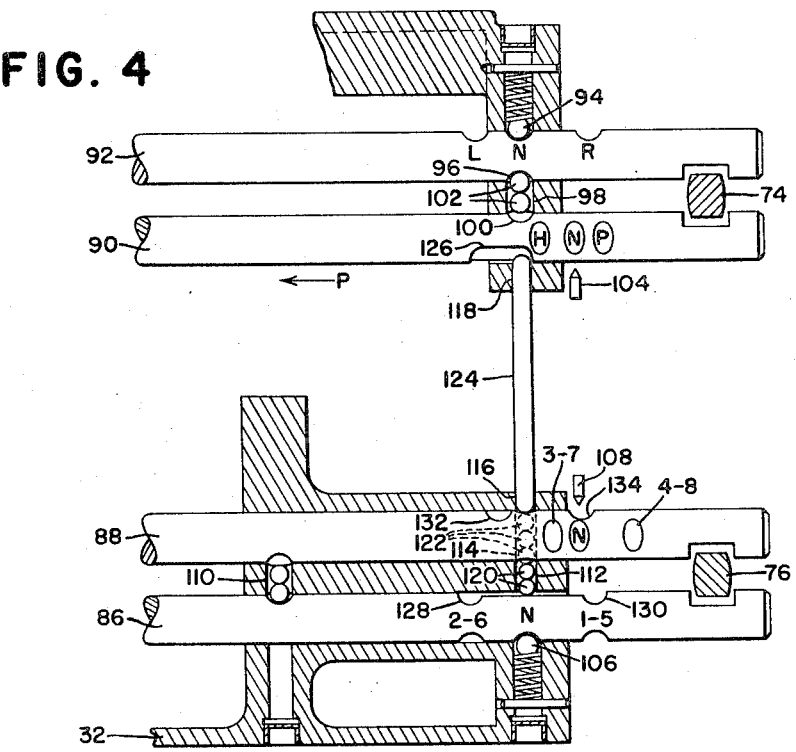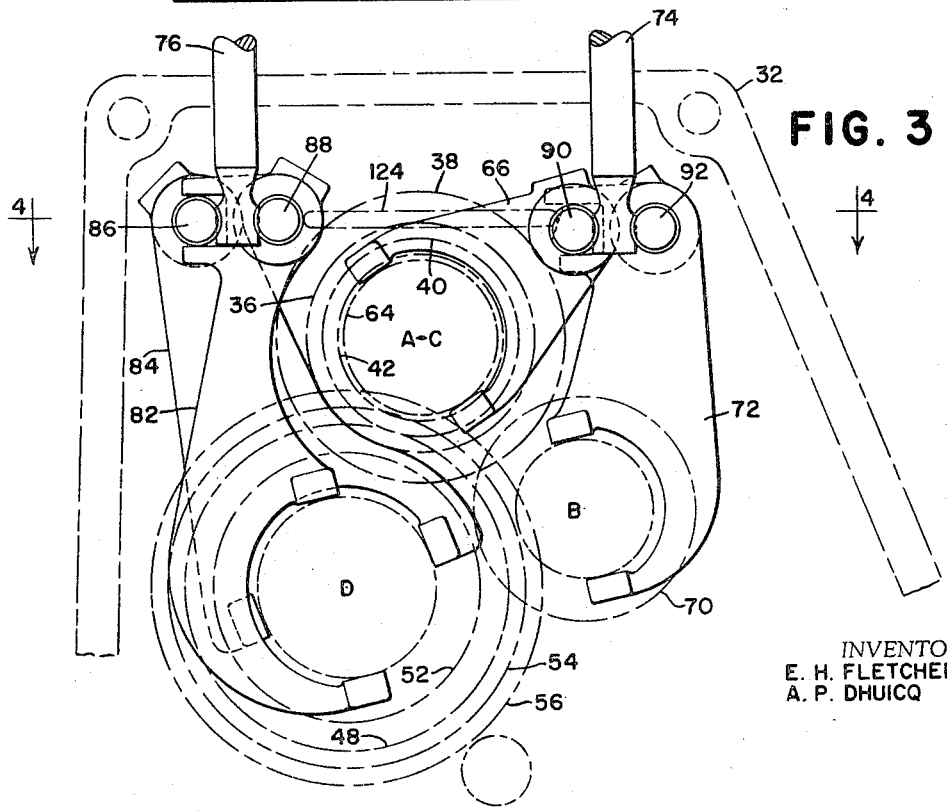

INVENTORS
E. H. FLETCHER
A. P. DHUICQ

United States Patent Office 3,301,079
Patented Jan. 31, 1967

3,301,079
VEHICLE TRANSMISSION
Edward H. Fletcher, Waterloo, Iowa, and Andre P. Dhuicq, Orleans, Loiret, France, assignors to Deere & Company, Moline, Ill., a corporation of Delaware
Filed Sept. 15, 1964, Ser. No. 396,566
7 Claims. (Cl. 74—333)

This invention relates to a vehicle transmission and more particularly to improvements in the so-called range-speed type of transmission wherein the speeds in a speed section of the transmission may be doubled by high and low ratios in the range section and in addition will provide a basic number of reverse speeds by reverse reduction gearing in the range section.

The invention has for its principal object the provision of an improved and simplified transmission, being economically and compactly designed and constructed and utilizing a minimum number of shafts and gears by resort to multiple use of certain of the transmission components. It is a further object of the invention to provide a transmission of the speed-range type in which the low and reverse speeds are opposite to each other so that the transmission may be easily and quickly shifted between low and reverse, which is significant from the standpoint of the utilization of the vehicle in "shuttle" operations, as in tractor-mounted loaders and the like. The transmission features the use of the low and reverse reduction gearing on the countershaft rather than one of the main shafts and in addition utilizes a journaled main shaft gear as an idler.

It is a further object of the invention to arrange the gearing so that in one range sequential speeds may be obtained and in the other range additional sequential speeds may be obtained. The arrangement features the spacing of the speeds in the low range in such fashion that they may be conveniently used in heavy-duty work, as in agriculture, industry, etc., whereas the spacing of the speeds in the high range are such as to enable convenient use of the tractor, for example, on roads and the like.

A further object of the invention resides in the utilization of part of the range gearing to secure a parked or locked condition of the transmission, in which respect one of the range gears is movable into engagement with a fixed portion of the frame or housing whereby to lock the shafting against turning. The arrangement features also the provision of an interlock between the range gear and the speed section so that one of the speeds in the speed section must be achieved before the park condition can be obtained, thereby assuring interlock between the vehicle axle and the vehicle frame.

The foregoing and other important objects and desirable features inherent and encompassed by the invention will become apparent as a preferred embodiment thereof is disclosed, by way of example, in the ensuing description and accompanying sheets of drawings, the figures of which are described below.

FIG. 1 is a schematic view, partly in section, showing the overall characteristics of the transmission.

FIG. 2 is a schematic view representing the shift pattern.

FIG. 3 is an enlarged end view of the transmission, with certain parts being omitted.

FIG. 4 is a fragmentary section as seen generally along the line 4—4 of FIG. 3 and showing all the shifters in their respective neutral positions.

Figure 5:
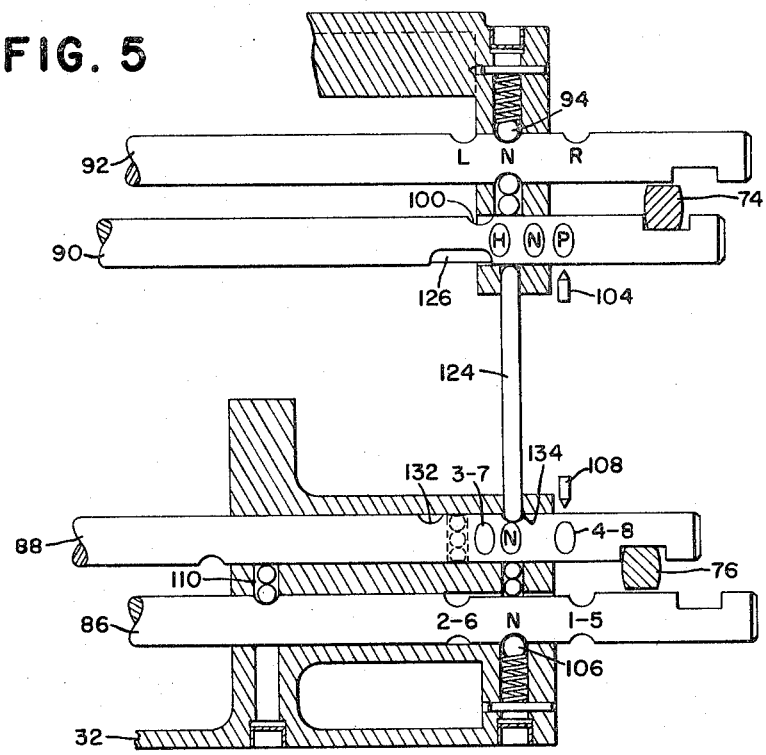
FIG. 5 is a similar view but showing one pair of shifters shifted out of their respective neutral positions.

For purposes of convenience the transmission shown in FIG. 1 may be regarded as having its longitudinal center line fore and aft, with the front of the vehicle being beyond the right-hand end of the sheet. The numeral 10 represents the rear end of an internal combustion engine, for example, whose crankshaft 12 is connected in typical fashion to a rotating clutch housing 14 which contains two clutch plates 16 and 18 connected respectively to coaxial shafts 20 and 22. The shaft 22 is hollow and the shaft 20 extends therethrough, being the basic input shaft for the transmission. The hollow shaft 22, driven independently by the clutch 18, carries a small gear 24 and a large gear 26 which mesh respectively with power shaft gears 28 and 30. These may be connected in any suitable fashion to a dual-speed PTO, the details of which are not material here. In general, drives of this type are common in agricultural and industrial tractors.

The shaft 20 also bears the character A for purposes of identification and orientation in FIG. 3, which will become clear as the description progresses.

The transmission is carried in a suitable housing or frame, portions of which are shown schematically and identified in general by the reference numeral 32. These housing portions may be regarded as including suitable bearings for carrying the respective transmission shafts.

An intermediate shaft C is appropriately carried by the housing 32 in coaxial end-to-end relation to the input shaft 20, the two including a suitable pilot bearing, as at 34.

The intermediate shaft C has coaxially fixed thereon in axially spaced relation a plurality of gears 36, 38, 40 and 42. These are used to provide the four basic speeds in the transmission which, as will be hereinafter brought out, are doubled to give the transmission eight speeds forward and which are reversed to give the transmission four speeds in reverse.

Parallel to the intermediate shaft C is an output shaft D, the rear end of which is shown here as having fixed thereto a bevel pinion 44 for driving a ring gear shown schematically at 46. A gear 48 is journaled on the shaft D and is in constant mesh with the first intermediate shaft gear 36. This gear includes an internal gear or toothed clutch 50. A second gear 52 is coaxially splined to the shaft D for selective shifting into mesh with either the internal teeth 50 on the gear 48 or the external teeth on the second intermediate shaft gear 38. As will be brought out more clearly hereinafter, shifting of the gear 52 to the right produces third or seventh speeds forward or third speed in reverse. Shifting of this gear to the left provides fourth and eighth speeds forward and fourth speed in reverse.

A double gear comprising gears 54 and 56 is also splined on the shaft D and is selectively shiftable in opposite directions to mesh the gear 54 with the intermediate shaft third gear 40 or to mesh the gear 56 with the intermediate shaft fourth gear 42. When the gears 54 and 40 are in mesh, the transmission will give second or sixth speeds forward or second speed in reverse. The engagement between gears 56 and 42 gives first or fifth speeds forward or first speed in reverse. The gears are shown in their neutral conditions in the drawings.

The rear end of input shaft 20 or A has coaxially fixed thereto a gear 58 which has a terminal rear portion thereof provided with a toothed clutch part 60. The forward end of the intermediate shaft C is enlarged and splined at 62 to axially shiftably carry an internally splined clutch element or sleeve 64. This sleeve is shown in its neutral condition, out of which it may be shifted forwardly, or to the right as seen in the drawings, to connect the splined portion 62 to the clutch teeth 60, thereby interconnecting shafts A and C for conjoint rotation. Any suitable shifter means, as at 66, may be utilized to effect the shifting of the clutch element 64.

It will be seen that when the clutch element 64 interconnects the shafts A and C, the intermediate shaft is of course driven and any one of four speeds may be obtained by shifting the gears 52, 54 and 56. This is the high range in the range section of the transmission, since the connection between the two shafts A and C is direct; that is, without ratio-reduction. That portion of the transmission comprising the intermediate shaft C and its gears and the output shaft D and its gears is regarded as the speed section, since it is in this section that the several speeds are selected. That portion of the transmission including the shiftable clutch 64 and low-reverse means to be presently described constitutes the range section, since this section doubles the four speeds available in the speed section and also makes these four speeds available in reverse.

A portion of the range section includes a countershaft B, appropriately journaled on an axis parallel to the axis of the shafts A–C. The forward end of the countershaft B has fixed thereto a gear 68 which is in constant mesh with the output shaft gear 58. The countershaft B is selectively connectible to the intermediate shaft C to drive this shaft either forwardly or in reverse. In the present case, the means for accomplishing this comprises a gear 70 splined to the shaft B and having a neutral position centered between the intermediate shaft second gear 38 and the output shaft first gear 48. At this point, it should be observed that the shafts A, B and C in FIG. 1 are out of their respective true positions. Their actual positions will be clear from FIG. 3. Also, countershaft B and its gears 68 and 70 have been repeated in dotted lines to show the relationship of the gear 70 to the gear 48.

Since the gear 48 is in constant mesh with the intermediate shaft first gear 36 and since it may be meshed with the shiftable gear 70 on the countershaft B, the gear 48 serves as a reverse idler. Meshing of the gears 70 and 48 is accomplished by shifting gear 70 forwardly or to the right as seen in the drawings. Any suitable shifter fork, as at 72 may be used for this purpose. When the gear 70 is shifted in the opposite direction, it meshes directly with the intermediate shaft second gear 38, thus driving the intermediate shaft in a direction that ultimately provides forward drive for the vehicle.

The range and speed sections of the transmission are initially under control of two shift levers 74 and 76 respectively. See FIGS. 2 and 3. The pattern for the range lever is typically in the form of a letter H so that when the lever 74 is rocked to one side or the other of a laterally central position, it may be moved fore and aft in either a low-reverse path or a park-high path. The same is generally true of the lever 76 which is movable in either of two fore-and-aft paths, producing the speeds indicated by the numerals in FIG. 2, depending upon the position of the lever 74. That is to say, if the lever 74 is at L, it means that the gear 70 on countershaft B is meshed with gear 38 on intermediate shaft C, thus establishing low forward range. The forward speeds will then be first, second, third and fourth. If the lever 74 is moved to its H position, that entails engagement of the clutch element 64 between the input and intermediate shafts, establishing direct drive so that the four speeds available in the speed section are fifth, sixth, seventh and eighth. Likewise, shifting of the lever 74 to its R position gives the vehicle first, second, third and fourth speeds in reverse.

A parking lock for the transmission is afforded by the provision of a toothed lock member 78 rigidly secured to the transmission housing 32 and having an annular row of internal teeth 80. As will be seen from FIG. 1, shifting of the clutch element 64 rearwardly or to the left as seen in the drawings will engage its teeth with the internal teeth 70 on the lock member, thus locking the intermediate shaft C to the housing so that it can not rotate. However, this lock is not effective to lock the vehicle against rolling unless one of the speed section ratios has been first achieved. That is to say, one of the sets of gears 52–48, 52–38, 54–40 or 56–42 must be engaged so that the ring gear, meshing with the pinion 44, is locked via locking of the shaft C at 64–80. These details will be covered subsequently.

From the description thus far, it will be seen that the transmission utilizes a minimum number of shafts and gears. The utilization of the gear 48 as a reverse gear or reverse idler on the output shaft D eliminates an extra idler and enables the use of the low-reverse portion of the range section on the countershaft B. This means that the speed ratios available in first through fourth are available also in first through fourth in reverse, a significant improvement in transmissions for use in shuttle operations. The intermediate shaft gear 38 is not only a speed change gear but is also part of the range drive in low, when the gear 70 is in mesh therewith.

By way of exemplary speeds in a tractor with a given power plant and traction wheels of a given size, forward speeds in low range (first through fourth) may be on the order of (in m.p.h.) 1.18, 1.68, 2.50 and 3.50. In high range (fifth through eighth, also in m.p.h.) the speeds would be 4.67, 6.68, 9.91 and 13.87. The four lower speeds are all in low range and therefore may be used sequentially, as in heavy-duty operation. Likewise, the four higher speeds (fifth through eighth) are sequentially in the high range and may also be used where higher speeds are desired. For example, the tractor may be readily started in fifth speed on most roads and easily upshifted to eighth to travel at 13.87 m.p.h.

The four reverse speeds are, in m.p.h., 1.39, 1.98, 2.93 and 4.11. This involves the desirable forward-reverse ratio differential for shuttle operation, since in most instances the reverse speed should be somewhat faster than the comparable forward speed. The transmission gearing and the shift pattern is such that the lever 74 may be conveniently shuttled between the L and R positions.

As described above, the shiftable elements 64 and 70 are shiftable respectively by shifter forks 66 and 72. The gear 52 is shiftable by a fork 82 and the double gear 54–56 is shiftable by a fork 84. These are shown also in FIG. 3.

For the purpose of carrying the forks for shifting movement, the housing 32 is provided with four shifters or rails 86, 88, 90 and 92. The two rails 86 and 88 are speed section shifters and the two rails 90 and 92 are range section shifters. The former two are controlled by the shifter level 76 and the latter two by the range level 74, as will be clear from FIG. 4 wherein it is shown that the rails are notched respectively to receive the associated levers, which will be clear without further elaboration.

In FIG. 4, all shifters are in their neutral positions. By way of example, the L-R shifter 92 is provided at one side thereof with three notches, here labeled L, N and R. A typical detent, as at 94 is shown in engagement with the recess or notch N to releasably retain the neutral position. The shifter 92 is provided at its side diametrically opposite to the N recess with a recess 96 which, in the neutral position of the shifter, is in register with a housing bore 98, as is a notch 100 in the proximate side of the neutrally positioned H-P shifter 90. A pair of balls 102 in the bore 98 provide an interlock so that both rails 90 and 92 cannot be simultaneously shifted out of neutral. This may be regarded as a typical construction.

The top side of the rail 90 is, in this case, provided with three notches identified here by the letters H, N and P for receiving a detent ball similar to that shown at 94. This particular detent is at 90° to the axis of the detent 94 and therefore is represented only schematically at 104.

The 2–6, 1–5 rail 86 has, like the rail 92, three notches identified respectively by the legends 2–6, N and 1–5. A detent 106 releasably retains the neutral position. The rail 88, like the rail 90, has its detent arranged vertically and therefore this detent is shown schematically at 108, it being understood that it may be exactly like the detent at 94. A rail interlock, as between the rails 86 and 88, is shown at 110, but need not be described specifically since it may be regarded as identical to that previously described at 96–102.

As previously described, it is one of the characteristics of the parking lock established by the shiftable clutch element 64 that it is not effective as a parking lock unless one of the speed section ratios is first achieved. For this purpose, there is established an interlock among the rails 86, 88 and 90 so that the rail 90 may not be shifted in its park direction (arrow P in FIG. 4) until one or the other of the four speeds in the speed section is first attained. That is to say, shifting of one or the other of the rails 86 or 88 is a condition precedent to shifting of the rail 90 in its park direction. Stated broadly, this mechanism comprises means cooperative among the three rails 86, 88 and 90 for achieving the result described.

Specifically, the means comprises a plurality of lock means disposed transverse to the paths of movement of the three rails in question. For purposes of clarity, the three rails may be considered first, second and third rails 86, 88 and 90 respectively. The housing 32 in the area between the first and second rails 86 and 88 has a transverse bore 112 and a coaxial second bore is made up of a pair of transversely alined housing bore portions 116 and 118 between the second and third rails 88 and 90. The separation of the two bore portions 118 and 116 is a peculiarity of the housing but for all practical purposes the two may be regarded as a single bore. The rail 88 has a transverse through bore 114 therein which is in register with the bore portions 112 and 116 when the rail 88 is in its neutral position, which it is in FIG. 4 (note the alinement between the detent 108 and the N notch).

A pair of balls 120 in the bore 112 comprises a first lock means. A second set of balls 122 in the bore 114 of the rail 88 constitutes a second lock means. A rod 124 establishes a third lock means. The three lock means are in alinement and in end-to-end relationship when all the shifter rails are in neutral. The combined length made up by the two balls 120 is substantially equal to the length of the bore 112. The combined length of the three balls 122 is substantially equal to the length of the rail bore 114. The length of the rod 124 is equal to the distance between the ends of the bore portions 116 and 118 plus the depth of a recess 126 in the side of the H–P rail 90 opposite to the interlock notch 100. Since the sides of the rails 86 and 88 are uninterrupted in the areas of the respective locking means when these rails are in neutral, the balls 122 engage the proximate end of the rod 124 and assure that the remote end is received in the notch 126 in the H–P rail 90. Considering now that the direction of movement of the rail 90 to achieve its park position is to the left as seen in the drawings (arrow P) it follows that the remote end of the rod 124 blocks such movement. In this particular case, the notch 126 is elongated in such direction that the rail 90 may be moved to its high position irrespective of the positions of the rails 88 and 86. The significant thing is that the rail 90 cannot be shifted to its park position until one or the other of the rails 86 or 88 is moved to a speed-change position.

This result is made possible by the provision in the rails 86 and 88 of notches to accommodate portions of the lock means when the speed change positions are attained. Thus, the rail 86 has therein a pair of notches respectively diametrically opposite the 2–6 and 1–5 detent notches. These are identified at 128 and 130 respectively. At 90° to its 3–7, N and 4–8 notches, the rail 88 has a pair of notches 132 and 134. When the rails are in their respective neutral positions, these notches are of course out of register with the locking means.

An example of a speed-change condition permitting movement of the H–P shifter 90 to its park position appears in FIG. 5, wherein it is shown that the 3–7, 4–8 shifter 88 is moved to its 4–8 position (engaging the speed section gears 52 and 38). This movement of the rail 88 causes the notches 134 therein to register with the approximate end of the rod or third lock means 124. The depth of this notch is equal to that of the recess 126 in the rail 90, thus accommodating transverse shifting of the rod 124 when longitudinal force is applied to the rail 90 in the park direction. As seen in the upper portion of FIG. 5, the park position is achieved (note the alinement of the detent 104 with the P notch).

The same condition would obtain were the shift rail 88 shifted in the opposite direction or to its 3–7 position, in which event the other notch 132 would accommodate the proximate end of the rod 124 so that the remote end could be cleared from the recess 126.

Figure 6:
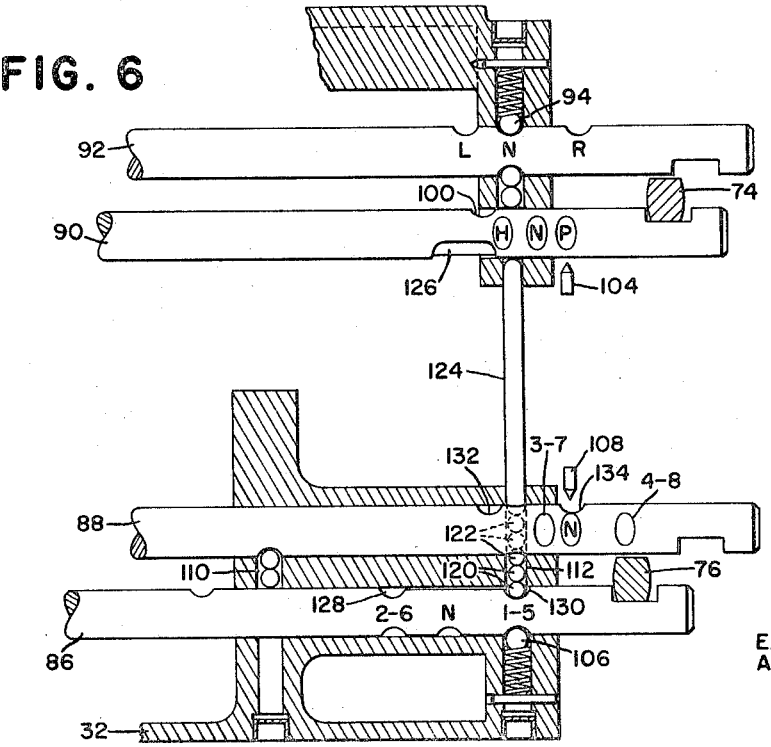
FIG. 6 is a similar view showing a different pair of out-of-neutral shifters.

FIG. 6 illustrates another example in which the other speed-change rail 88 has been moved to a speed-change position. In this case, the rail 86 has been moved to its 1–5 position so that its notch 130 registers with the housing bore 112 whereby lateral displacement of the first locking means, comprising the balls 120, enables lateral shifting of the complete end-to-end locking system, thereby accommodating release of the remote end of the bar 124 from the recess 126 in the rail 90. The use of the sets of balls 120 and 122 is preferred to making these locking means of individual one-piece members, because the balls are more readily sized.

Another characteristic of the arrangement is that the tractor cannot be inadvertently driven while in park position, even though a speed-change has been made, because the park position automatically means that the range section is in neutral, or at least is out of low, high or reverse. This is simply a function of the fact that the same lever is used and this lever cannot be in "park" as well as in any other range position.

Features of the invention in addition to those enumerated herein will readily occur to those versed in the art, as will many modifications and alterations in the preferred embodiment disclosed, all of which may be achieved without departure from the spirit and scope of the invention.

What is claimed is:

1. A vehicle transmission comprising an input shaft, a relatively rotatable intermediate shaft disposed in coaxial end-to-end relation to said input shaft, a countershaft parallel to said shafts, constant-mesh gearing drivingly connecting the input and countershafts, an output shaft parallel to said shafts, first and second coaxially spaced apart gears fixed to the intermediate shaft, a reverse gear coaxially journaled relative to the output shaft and meshing with the intermediate shaft first gear, forward-reverse drive means including a member rotatable with the countershaft and axially shiftable thereon selectively among a central neutral position, a forward position driving the intermediate shaft second gear and a reverse position driving said reverse gear, direct-drive means coaxially on and selectively connectible and disconnectible between the input and intermediate shafts, additional gearing selectively connectible and disconnectible between the intermediate and output shafts and housing means journaling said shafts.

2. The invention defined in claim 1, including further gearing selectively connectible and disconnectible between said intermediate and output shafts and including an element coaxially carried by the output shaft for rotation therewith and for selective axial shifting into and out of engagement with said reverse gear.

3. The invention defined in claim 1, including further gearing selectively connectible and disconnectible between said intermediate and output shafts and including an element coaxially carried by the output shaft for rotation therewith and for selective axial shifting in one direction from a central neutral position to connect the output shaft to the reverse gear and in the opposite direction from said neutral position to connect the output shaft to said intermediate shaft second gear.

4. The invention defined in claim 1, including further gearing selectively connectible and disconnectible between said intermediate and output shafts and including an element coaxially carried by the output shaft for rotation therewith and for selective axial shifting selectively in opposite directions to establish and disestablish drive between the intermediate shaft second gear and said output shaft.

5. The invention defined in claim 1, in which the direct-drive means includes a clutch part rotatable with and carried by the intermediate shaft for axial shifting in one direction from a control neutral position to couple the input and intermediate shafts and shiftable in the opposite direction from said neutral position to a park position, and said housing means having a portion lockably engaged by said clutch part in said park position.

6. The invention defined in claim 1, in which the constant-mesh gearing includes a gear coaxially fixed to the input shaft adjacent to the proximate end of the intermediate shaft, and said direct-drive means includes clutch teeth coaxially on said input shaft gear and a clutch part coaxially keyed to said proximate end of the intermediate shaft and selectively engageable with and disengageable from said clutch teeth.

7. The invention defined in claim 6, in which said proximate end of the intermediate shaft is externally splined, said clutch part is cooperatively internally splined and carried by said end for axial shifting in one direction from a central neutral position to engage with said input shaft gear clutch teeth and in the opposite direction from said neutral position to a park position, said clutch part having external clutch teeth thereon and said housing means having a tooth portion engaged by said external teeth in said park position of said clutch part.

References Cited by the Examiner
UNITED STATES PATENTS

| | | | |
|---|---|---|---|
| 1,864,142 | 6/1932 | Meyer | 192—4 |
| 3,106,273 | 10/1963 | Doerfer et al. | 74—360 |

DAVID J. WILLIAMOWSKY, *Primary Examiner.*

H. S. LAYTON, *Assistant Examiner.*